(12) United States Patent
Lee et al.

(10) Patent No.: US 7,450,854 B2
(45) Date of Patent: Nov. 11, 2008

(54) HIGH-SPEED WIRELESS LAN SYSTEM

(75) Inventors: Jong-Hun Lee, Suwon-si (KR); Yun-Je Oh, Yongin-si (KR); Do-In Choi, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 718 days.

(21) Appl. No.: 10/860,718

(22) Filed: Jun. 3, 2004

(65) Prior Publication Data

US 2005/0135811 A1 Jun. 23, 2005

(30) Foreign Application Priority Data

Dec. 22, 2003 (KR) ............... 10-2003-0094583

(51) Int. Cl.
*H04B 10/10* (2006.01)
*H04K 1/00* (2006.01)

(52) U.S. Cl. .................. 398/115; 398/118; 398/116; 398/128; 398/135; 380/270; 380/256

(58) Field of Classification Search ......... 398/115–117, 398/66, 67, 118, 135, 128; 372/26; 380/239, 380/270, 259, 260, 273, 277; 455/41.2, 151.2
See application file for complete search history.

(56) References Cited

U.S. PATENT DOCUMENTS

| | | | | |
|---|---|---|---|---|
| 4,484,027 A * | 11/1984 | Lee et al. | ............... | 380/239 |
| 5,289,480 A * | 2/1994 | Koai et al. | ............... | 372/26 |
| 5,608,723 A * | 3/1997 | Felsenstein | ............... | 370/335 |
| 5,946,120 A * | 8/1999 | Chen | ............... | 398/155 |
| 6,901,241 B2 * | 5/2005 | Bjorndahl | ............... | 455/41.2 |
| 2004/0015693 A1 * | 1/2004 | Kitazumi | ............... | 713/171 |
| 2004/0146296 A1 * | 7/2004 | Gerszberg et al. | ............... | 398/12 |
| 2005/0163503 A1 * | 7/2005 | Lee et al. | ............... | 398/19 |

FOREIGN PATENT DOCUMENTS

| | | | |
|---|---|---|---|
| EP | 1024626 | * | 8/2000 |
| JP | 2002-124960 | | 4/2002 |
| JP | 2002-300311 | | 10/2002 |
| JP | 2003-318992 | | 11/2003 |

* cited by examiner

*Primary Examiner*—Kenneth Vanderpuye
*Assistant Examiner*—Li Liu
(74) *Attorney, Agent, or Firm*—Cha & Reiter, LLC

(57) ABSTRACT

A high-speed wireless LAN system is disclosed. The system includes a mobile station for transmitting/receiving data encrypted by a predetermined encryption method, communicating the data to associated access points by an ultra wideband (UWB) communication method, and communicating an encryption key according to the encryption method to said associated access points by an optical or infra-red (IR) communication method; the plurality of access points, installed in a plurality of predetermined service areas, for relaying between the mobile station and a gateway of a remote place by communicating the data and the encryption key with the mobile station located in the corresponding service area by the UWB and the optical or IR communication methods and transmitting/receiving the data and the encryption key to/from the gateway by an optical communication method; and the gateway for providing an optical interface between an internal network and an external network, being provided with a plurality of gateway sub-modules for transmitting/receiving the data and the encryption key by communicating with the plurality of access points by the optical communication method, and transmitting a subscriber service transmitted from the external network to the corresponding access point.

5 Claims, 6 Drawing Sheets

HIGH-SPEED WIRELESS LAN SYSTEM

This application claims priority pursuant to 35 USC §119 to that patent application entitled "High-speed wireless LAN system," filed in the Korean Intellectual Property Office on Dec. 22, 2003 and assigned Serial No. 2003-94583, the contents of which are hereby incorporated by reference.

BACKGROUND OF THE INVENTION

1. Field of the Invention

The present invention relates to a wireless LAN system, and more particularly to a high-speed wireless LAN system using a combined UWB (Ultra Wide Band) communication method and an optical communication method.

2. Description of the Related Art

Superior mobility and lack of cable connection represent significant advantages of wireless LAN systems over comparable wire-ed LAN systems and wireless LAN systems are becoming more widely used by the general population. Current wireless LAN systems operate in the radio frequency (RF) band of 2.4 GHz or 5 GHz as a carrier, e.g., IEEE 802.11a, b and g, and the selected carrier is modulated to carry the data content. These wireless LAN systems provide a transmission speed of 22 Mbps in the 2.4 GHz band, or a transmission speed of 54 Mbps in the 5 GHz band, respectively.

Under such transmission speeds, however, it is difficult to provide a high-capacity and high-speed service through the existing wireless LAN system due to the bottlenecks that may occur in the home or office. To solve this problem, there has recently been proposed a method that uses an UWB (Ultra Wide Broadband) connection instead of the RF band as a transmission medium. The transmission speed of high-speed wireless LAN systems that uses UWB connection as the transmission medium can be 100 Mbps (Mega bits/sec) or more.

An UWB-based wireless LAN system has the advantage in that it can provide a high-speed and large-capacity service, but its serviceable area is limited typically to less than 10 meters (m). Accordingly, conventional UWB-based wireless LAN systems use one gateway and a plurality of DAP (Dummy Access Point) properly arranged at important points within the network to increase the operating range. The gateway and the DAPs are typically connected together through an optical fiber.

FIG. 1 is a block diagram illustrating an example of the main parts of an UWB-based high-speed optical wireless LAN system. Referring to FIG. 1, the optical wireless LAN system shown includes a gateway sub-module 130, a plurality of access points (APs/DAPs) 120 and a plurality of mobile stations (STAs) 110, e.g., notebook computers. This system configuration may be referred to as a 'UWB over fiber' transmission, as the UWB connection is established using an optical fiber connection. In FIG. 1, one AP 120 and one mobile station 110 are illustrated for the convenience of explanation. However, it would be recognized by those skilled in the art that a plurality of APs 120 and stations 110 may be included within a wireless LAN system.

Referring to FIG. 1, the mobile station 110 transmits data modulated in a format according to the UWB communication method, or demodulates data received in the UWB format to the original data. Station 110 includes a UWB module 112 for transmitting/receiving UWB signal through UWB antenna 113. AP 120 also includes UWB antenna 123 through which the AP 120 transmits/receives, wirelessly, the UWB signal to/from the mobile station 110. AP 120 also includes WB optical transmitter/receiver 124 which transmits/receives a UWB signal to/from the gateway sub-module 130 through optical fibers 140, 150. The gateway sub-module 130 includes UWB optical transmitter/receiver 134, which transmits/receives the UWB signal to/from the AP 120 through the optical fiber 150, 140, respectively. UWB module 132 modulates data to be transmitted through the optical transmitter/receiver 134 to a UWB format, or demodulates the data received in the UWB format to the original data. A large-capacity subscriber service can be provided through a Fiber-To-The House (FTTH) connection, wherein gateway sub-module 130 serves to provide services such as multimedia, VOD (Video On Demand), EOD (Education On Demand), AOD (Audio On Demand), etc., to the respective AP (DAP) 120 or directly to terminal, e.g., mobile station 110, without occurring a service collision.

Although not shown in FIG. 1, a UWB signal can be transferred to a plurality of APs 120 arranged at proper points of the LAN controlled by gateway sub-module 130 through the optical fiber. In this case, in order to transmit the UWB formatted signal through the optical fiber, the UWB formatted signal is directly modulated and transmitted, and this method is called the 'UWB over fiber'. Using the 'UWB over fiber' technique, the limited service area can be expanded using the APs 120 arranged at proper points.

The UWB-based high-speed wireless LAN system as described above can perform a high-speed data transmission of 100 Mbps or more by using the UWB formatted signal instead of the RF signal. However, since the UWB formatted signal can easily pass through obstacles, according to the property of the medium, it is potentially in danger of being intercepted and subject to access by unauthorized persons. Hence the security of such UWB systems is considered weak. In order to improve the protection and security characteristic of the UWB system diverse encryption techniques and authentication methods such as WEP (Wired Equivalent Privacy), AES (Advanced Encryption Standard), and WPA (WI-FI Protected Access) are applied to the UWB-based high-speed wireless LAN system. However, such an application of encryption techniques and the authentication methods increases the cost of the UWB system and occupies valuable bandwidth.

Systems using an optical signal, e.g., IR (Infra-Red), have been shown to have a superior security characteristic as the optical or IR signal cannot pass through an obstacle, and thus it is more difficult to intercept. Hence the security of such a system is significantly increased. FIG. 2 represents a block diagram illustrating an example of the main parts of an optical or IR-based wireless LAN system that exhibits a superior security characteristic. The IR wireless LAN system includes a gateway sub-module 230, a plurality of access points (APs) 220, and a plurality of mobile stations 210. Again, as with regard to FIG. 1, only one element of each type is shown for purposes of explanation.

As shown, mobile station 210 is provided with an IR module 226 for transmitting/receiving an IR signal, and AP 220 is provided with an IR optical transmitter/receiver for transmitting/receiving an IR signal to/from the mobile station 210. AP 220 further transmits/receives the IR signal to/from the gateway sub-module 230 through optical fibers 240, 250, respectively. The gateway sub-module 230 includes IR module 236 provided with an IR optical transmitter/receiver 234 for transmitting/receiving the IR signal to/from the AP 220 through the optical fibers 240, 250. Although not shown, it would be recognized that gateway sub-module 230 and the mobile station 210 may directly communicate with each other without passing through the AP 220.

The gateway sub-module 230 modulates a signal inputted from an external network (not shown) onto an IR carrier signal, and transmits the IR carrier signal to the AP 220 through IR optical transmitter/receiver 234. AP 220 receives the IR signal transmitted from the gateway sub-module 230 through IR optical transmitter/receiver 224, and retransmits the IR signal, wirelessly, through optical antenna 221. The IR signal transmitted wirelessly is received in the IR module 216 of the mobile station 210, and then restored to the original signal.

According to the above-described construction, if any one intercepts the IR signal while the IR communication between the AP 220 and the mobile station 210 is performed the IR signal is not received by the mobile station 210, and, thus, by grasping this lack of communication, the user can confirm that interception has occurred.

However, the conventional optical or IR signal has an imposed output power limitation in accordance with an eye-safety regulation. For example, in the case of the IR signal having a wavelength of 650 nm, its output power is limited to less than 0.2 mW. The limit of the output power causes the transmission speed to be limited to less than several Mega bits/second (Mbps), and thus significant limitations in the use of high-speed wireless LAN system using optical or IR communications exist.

In spite of the good mobility and convenience of the wireless LAN system, security concerns limit the use of a UWB wireless LANs in most companies. Since a wireless LAN system, without guaranteed security, causes problems in a company's large-scale introduction of such a wireless LAN system, it is a priority to introduce a wireless LAN system with guaranteed security.

In order to guarantee the security of the wireless LAN system, optical or IR signals may be used instead of the RF signal. However, as described above, in the case of constructing a wireless LAN using the optical or IR signal, the transmission speed is limited to less than several Mbps due to the limit of the output power according to the eye-safety regulation.

SUMMARY OF THE INVENTION

An object of the present invention is to provide a high-speed wireless LAN system which has superior security characteristics and a high transmission speed.

Another object of the present invention is to provide a high-speed wireless LAN system which has superior security characteristics at a low cost.

In order to accomplish these objects, there is provided a high-speed wireless LAN system characterized in that it encrypts the original data according to a predetermined encryption method through a UWB medium to transmit the encrypted data, and then it transmits the corresponding encryption key through an optical or IR medium that guarantees the security. Accordingly, while the encryption key is secured through the IR medium, a high-speed wireless data communication is performed through the UWB medium. The high-speed wireless LAN system according to the present invention can guarantee the security by transmitting the encryption key for security through the optical or IR signal having a superior security characteristic, and transmitting a high-speed data signal through the UWB connection.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Hereinafter, a high-speed wireless LAN system according to preferred embodiments of the present invention will be described with reference to the accompanying drawings. In the following description of the present invention, a detailed description of known functions and configurations incorporated herein will be omitted when it may make the subject matter of the present invention unclear.

Figure 1:
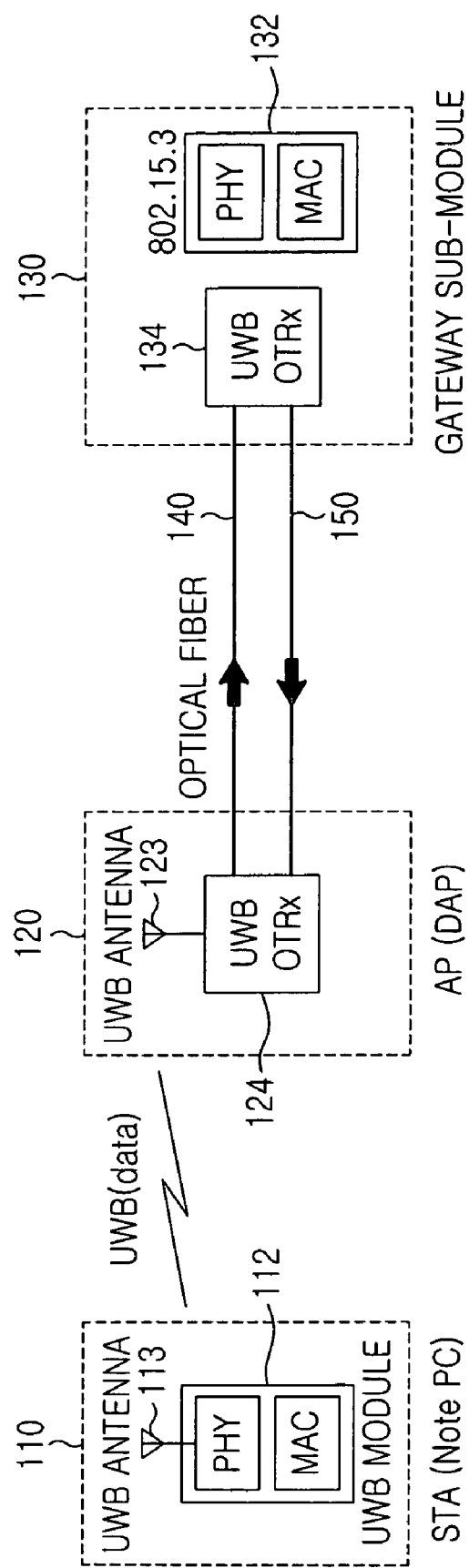
FIG. 1 is a block diagram illustrating an example of the main parts of a UWB-based high-speed wireless LAN system.
Figure 2:
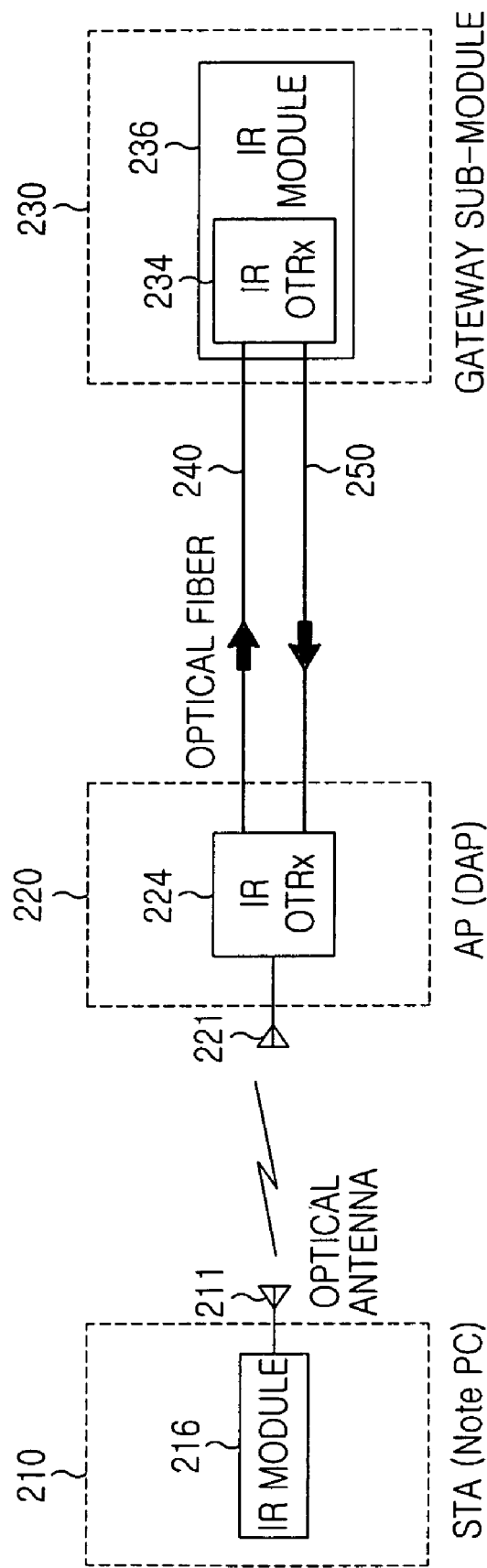
FIG. 2 is a block diagram illustrating an example of the main parts of an optical or IR-based wireless LAN system.
Figure 3:
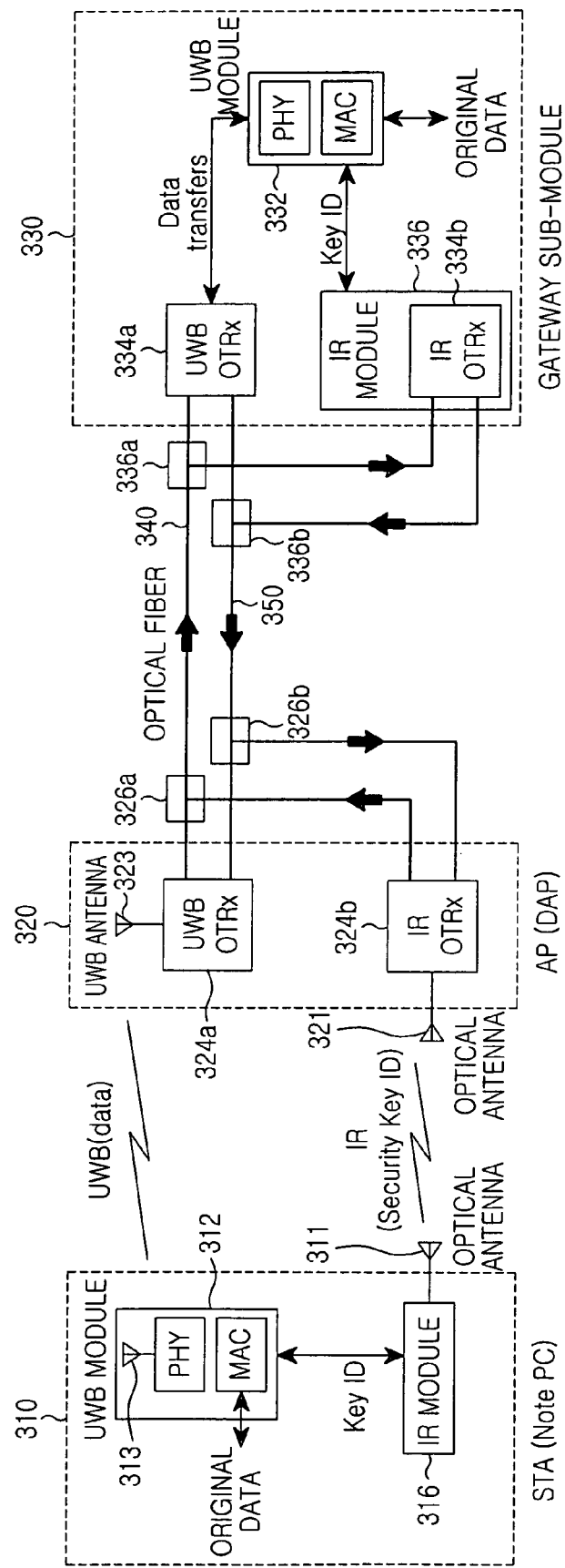
FIG. 3 is block diagram illustrating an example of the main parts of a high-speed wireless LAN system according to a first embodiment of the present invention.

FIG. 3 is block diagram illustrating an example of the main parts of a high-speed wireless LAN system according to an embodiment of the present invention.

Referring to FIG. 3, the high-speed wireless LAN system according to an embodiment of the present invention is provided with a UWB/IR-combined gateway sub-module 330, a UWB/IR-combined access point (AP) 320, and a UWB/IR-combined mobile station 310. The high-speed wireless LAN system is also provided with function blocks for transmitting/receiving encryption keys for security as optical or IR signals, i.e., optical or IR modules 316 and 336 and optical or IR optical transmitters/receivers 324b and 334b, and UWB modules 312 and 332 and UWB transmitters/receivers 324a and 334a for transmitting a high-speed data signal of greater than 100 Mbps through a UWB connection.

In this embodiment, the UWB/IR-combined gateway sub-module 330 and the UWB/IR-combined AP 320 are connected together through optical fibers 340, 350. The UWB/IR-combined gateway sub-module 330 and/or the UWB/IR-combined AP 320 modulates/demodulates a UWB signal to an signal suitable for transmission/reception through the UWB transmitter/receiver 324a or 324b using a 'UWB over fiber' method, and transmits the signal through the appropriate optical fiber 340, 350. Between the UWB/IR-combined gateway sub-module 330 and the UWB/IR-combined AP 320, the 'UWB over fiber' type signal used for a high-speed data transmission and the IR optical signal used as a security encryption key may be transmitted through different optical fibers (not shown) or through the same optical fiber, 340, or 350. In the exemplary embodiment shown in FIG. 3, optical fibers for transmission and for reception are separately provided between the UWB/IR-combined gateway sub-module 330 and the UWB/IR-combined AP 320, and both the UWB signal and the IR signal are transmitted/received through the optical fibers for transmission and for reception, respectively. The UWB signal and the IR signal, which are transmitted to, or outputted from, the corresponding UWB optical transmitters/receivers 324a and 334a and IR optical transmitters/receivers 324b and 334b through the same optical fiber, are combined and divided by proper optical signal combiners/dividers 326a to 326d. The construction and operation of the respective function blocks will now be explained in detail.

The UWB/IR-combined gateway sub-module 330 serves to provide an optical interface between an internal network and an external network, and is provided with UWB optical transmitter/receiver 334a, UWM module 332, IR optical transmitter/receiver 334b, and IR module 336. UWB optical transmitter/receiver 334a is an optical transmitter/receiver suitable to transmit/receive a high-speed data signal of more than 100 Mbps, which is transmitted from a physical (PHY) layer of the UWB module 332, through the optical fiber 350, and the optical or IR optical transmitter/receiver 334b is a transmitter/receiver for security that is required to transmit/receive the encryption key for security to/from the mobile station 310 through the UWB/IR-combined AP 320. In this case, a MAC (Media Access Control) layer serves to interface the high-speed data signal and the security signal with an upper layer in a manner that it transmits/receives the high-speed data signal through the UWB PHY layer, and transmits/receives the encryption signal for security to/from the IR optical transmitter/receiver 334b.

The UWB/IR-combined AP 320 is provided with the UWB optical transmitter/receiver 324a connected to UWB antenna 323, and the IR optical transmitter/receiver 324b connected to optical or IR antenna 321. In this case, the optical transmitter/receiver 324a and the UWB antenna 323 of the UWB/IR-combined AP 320 transmit, wirelessly, the high-speed data signal to the mobile station 310, or transmits the UWB signal received from the mobile station 310 to the UWB/IR-combined gateway sub-module 330 through optical fiber 340. Also, optical or IR transmitter/receiver 324b and optical antenna 321 of the UWB/IR-combined AP 320 transmit/receive the encryption key between the mobile station 310 and the UWB/IR-combined gateway sub-module 330. In this case, optical antenna 321 is designed to have a sufficient acceptance angle to receive and send the optical or IR signal. The optical or IR signal is designed to have a sufficiently low power to satisfy the eye-safety regulation when the communication is performed.

The UWB/IR-combined mobile station 310 is provided with the UWB module 312 connected to UWB antenna 313 and the IR module 316 connected to optical, e.g., IR, antenna 311. The UWB module 312 is used to transmit/receive the high-speed data signal between the UWB/IR-combined mobile station 310 and the UWB/IR-combined AP 320. Similarly, the IR module 316 is used to transmit/receive the encryption key to/from the UWB/IR-combined mobile station 310 and the UWB/IR-combined AP 320. The UWB PHY layer of the UWB module 312 serves to transfer the high-speed data signal to the UWB MAC layer. In this case, the encryption key, referred to as "Key ID" in the figure, which is transmitted/received through the IR optical antenna 311, is also provided from the IR module 316 to the UWB MAC layer and vice versa. Also, the MAC layer of the UWB module 312 transmits/receives the high-speed data signal through the UWB PHY layer, transmits/receives the encryption signal from/to the IR module 316 and interfaces the high-speed data signal and the encryption signal with the upper layer by performing an encapsulation or de-capsulation of the encryption signal.

Figure 4:
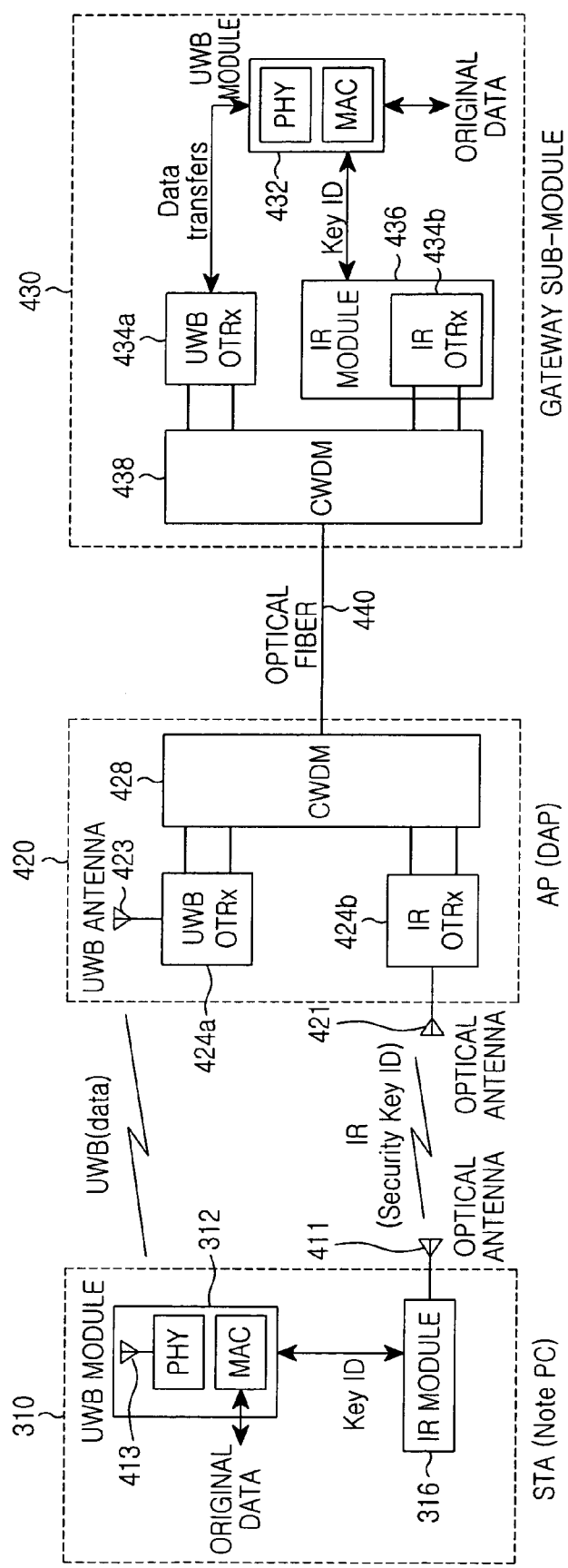
FIG. 4 is block diagram illustrating an example of the main parts of a high-speed wireless LAN system according to a second embodiment of the present invention.

FIG. 4 is block diagram illustrating an example of the main parts of a high-speed wireless LAN system according a second embodiment of the present invention. In this illustrated embodiment, the high-speed wireless LAN system uses a single optical fiber 440 for communication between the UWB/IR-combined AP 420 and the UWB/IR-combined gateway sub-module 430. In this embodiment, the UWB signal for transmitting the high-speed data signal and the optical or IR signal for transmitting the encryption key are CWDM (Coarse Wavelength Division Multiplexing)-multiplexed by modules 428 and 438 in AP 420 and gateway 430, respectively and then transferred via optical fiber 440.

In the same manner as the high-speed wireless LAN system described with regard to FIG. 3, the high-speed wireless LAN system of FIG. 4 is provided with a UWB/IR-combined gateway sub-module 430, a UWB/IR-combined access point (AP) 420, and a UWB/IR-combined mobile station 310. The high-speed wireless LAN system is provided with function blocks for transmitting/receiving encryption keys as IR signals, i.e., IR modules 316 and 436 and optical or IR optical transmitters/receivers 424b and 434b, and UWB modules 312 and 432 and UWB optical transmitters/receivers 424a and 434a for transmitting/receiving a high-speed data signal through a UWB connection.

In this case, the construction and operation of the UWB/IR-combined mobile station 310 are the same as that of the system of FIG. 3, except that CWDMs (Coarse Wavelength Division Multiplexers) 428 and 438 are provided in the UWB/IR-combined gateway sub-module 430 and the UWB/IR-combined AP 420, respectively, for multiplexing and transmitting/receiving the UWB signal and the IR signal through optical fiber 440. CWDM 438 included in the UWB/IR-combined gateway sub-module 430. multiplexes a signal transmitted from the UWB optical transmitter/receiver 434a and a signal transmitted from the IR optical transmitter/receiver 434b, and transmits the multiplexed signal to the CWDM 428 of the UWB/IR-combined AP 420 through optical fiber 440. CWDM 438 of the UWB/IR-combined gateway sub-module 430 also de-multiplexes the multiplexed optical signal transmitted from the CWDM 428 of the UWB/IR-combined AP 420, and transmits the de-multiplexed optical signals to the corresponding UWB optical transmitter/receiver 434a and IR optical transmitter/receiver 434b. In the same manner, CWDM 428 of the UWB/IR-combined AP 420 multiplexes/de-multiplexes the transmitted/received signals received from or destined to the UWB optical transmitter/receiver 424a and the IR optical transmitter/receiver 424b.

In the high-speed wireless LAN systems as shown in FIGS. 3 and 4, the IR optical transmitters/receivers and the UWB optical transmitters/receivers are provided in the UWB/IR-combined gateway sub-modules 330 and 430 and the UWB/IR-combined APs 320 and 420, respectively, in order to transmit the encryption keys using the optical or IR method and the high-speed data UWB signals using the 'UWB over fiber' method.

Figure 5:
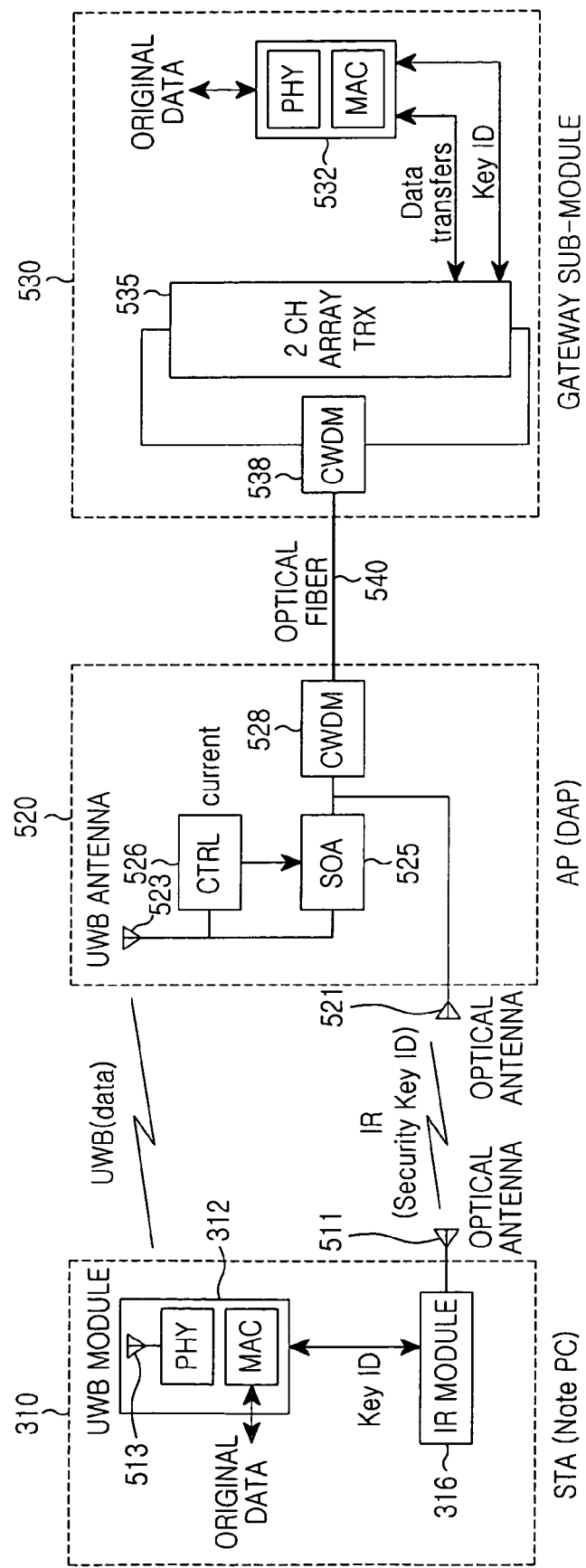
FIG. 5 is block diagram illustrating an example of the main parts of a high-speed wireless LAN system according to a third embodiment of the present invention.

FIG. 5 is block diagram illustrating an example of main parts of a high-speed wireless LAN system according to still another embodiment of the present invention.

In this illustrated embodiment the high-speed wireless LAN system is provided with a UWB/IR-combined gateway sub-module 530, a UWB/IR-combined access point (AP) 520, and a UWB/IR-combined mobile station 310. In order to transmit/receive the encryption key for security through the optical or IR port and to transmit/receive the high-speed data through the UWB, the UWB/IR-combined gateway sub-module 530 uses a 2-channel array optical transmitter/receiver module 535 employing center wavelengths as data carriers. In one aspect, a BI-DI (bi-directional) module may be used as such a 2-channel array optical transmitter/receiver module 535. CWDM 538 of the UWB/IR-combined gateway sub-module 535 is operable to multiplex the UWB signal and the IR signal outputted from the 2-channel array optical transmitter/receiver module 535, and transmit the multiplexed signal to a corresponding CWDM 528 within the UWB/IR-combined AP 520 through optical fiber 540. CWDM 538 is also operable to de-multiplex the multiplexed optical signal transmitted from CWDM 528, and provide the de-multiplexed signals to the 2-channel array optical transmitter/receiver module 535.

In this embodiment, the UWB/IR-combined AP 520 uses an SOA (semiconductor optical amplifier) 525 rather than the UWB and IR optical transmitters/receivers as illustrated in FIGS. 3 and 4. The SOA 525, which is imposed between the CWDM 528 and the UWB antenna 523, converts an optical signal corresponding to the UWB signal received from the UWB/IR-combined gateway sub-module 530 through the CWDM 528 into a wireless signal to be transmitted through the UWB antenna 523. The optical or IR signal, on the other hand, is transferred directly to optical or IR antenna 521. Similarly, SOA 525 is operable to output an optical signal, with its gain amplified according to the UWB signal received through the UWB antenna 523, to provide an optical signal to the CWDM 528 and the IR signal, inputted through the IR optical antenna 521, is provided to the CWDM 528. CWDM 528 then multiplexes the provided UWB signal and optical or IR signals and transmits the multiplexed signal to the CWDM 538 of the UWB/IR-combined gateway sub-module 530 through optical fiber 540. In a similar manner, CWDM 528 is operable to de-multiplex the multiplexed optical signal transmitted from the CWDM 538 of the UWB/IR-combined gateway sub-module 530, and provide the de-multiplexed signals to the SOA 525 and the IR antenna 521, appropriately.

The operation of the SOA 525 is determined by a current controller 526 for controlling an injection current of the SOA 525. Specifically, in the case of a downward communication for transmitting data from the UWB/IR-combined gateway sub-module 530 to the UWB/IR-combined mobile station 310, the current controller 526 causes SOA 525 to operate as an optical detector by applying current to the SOA 525 less than SOA 525 threshold current. In the case of an upward communication for transmitting data from the UWB/IR-combined mobile station 310 to the UWB/IR-combined gateway sub-module 530, current controller 526 causes SOA 525 to apply a gain factor by applying a current to the SOA 525 greater than SOA 525 threshold current.

In the system illustrated in FIG. 5, the UWB/IR-combined AP 520 is constructed so that it serves only to transfer the signal between the UWB/IR-combined gateway sub-module 530 and the UWB/IR-combined mobile station 310. In the illustrated embodiment, the UWB/IR-combined AP 520 uses a light source in the band of 1300 nm or 1500 nm. Transmission in this range can be used to supplement a signal loss that may occur as compared to the UWB/IR-combined AP provided with the IR optical transmitters/receivers.

Figure 6:
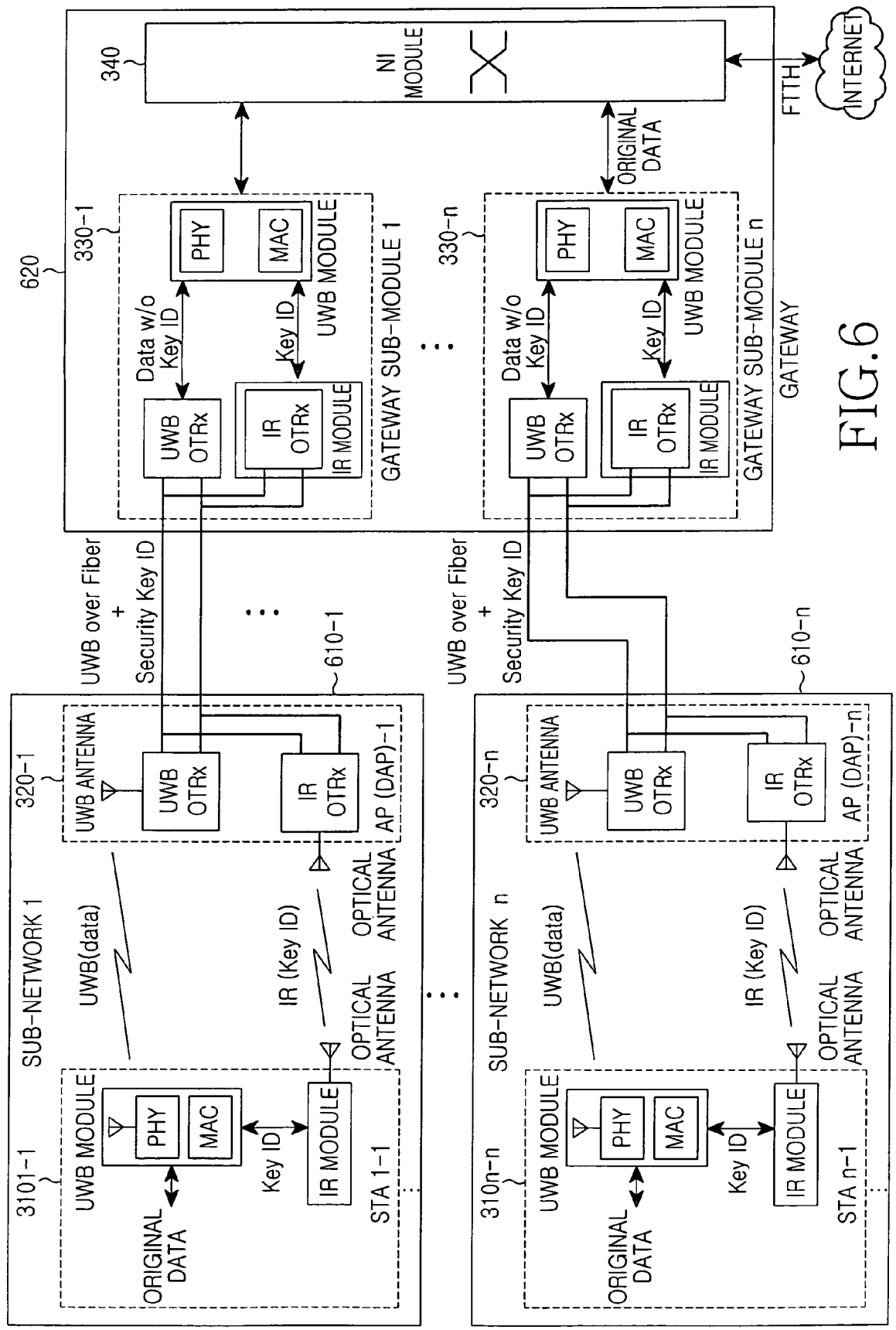
FIG. 6 is block diagram illustrating a high-speed wireless LAN system according to a fourth embodiment of the present invention.

FIG. 6 is block diagram illustrating the construction of a high-speed wireless LAN system according to an embodiment of the present invention.

The high-speed wireless LAN system of FIG. 6 may be installed in the home, company, building, or a plurality of adjacent buildings, and is includes a gateway, a plurality of associated UWB/IR-combined gateway sub-modules 330-1 to 330-n, and UWB/IR-combined APs 320-1 to 320-n connected to the UWB/IR-combined gateway sub-modules 330-1 to 330-n of the gateway 620, respectively. The UWB/IR-combined APs 320-1 to 320-n form sub-networks 610-1 to 610-n with respect to their serviceable areas. The respective sub-network includes a plurality of UWB/IR-combined mobile terminals 310-1 to 310-n that communicate with the corresponding UWB/IR-combined APs, respectively.

The respective UWB/IR-combined mobile stations 310-1 to 310-n transmit/receive the encryption key to/from the corresponding UWB/IR-combined APs using the IR signal and transmit the high-speed data signal using the UWB connection. The UWB/IR-combined APs 320-1 to 320-n transmit/receive the IR signal to/from the corresponding UWB/IR-combined gateway sub-modules through the optical fibers. The gateway 620 divides services, such as multimedia, VOD, EOD, AOD, etc., provided through the FTTH, among the corresponding UWB/IR-combined gateway sub-modules using an NI (Network Interface) module 340, and provides the services to the respective UWB/IR-combined APs or the mobile stations without occurring a service collision.

As described above, the high-speed wireless LAN system according to the present invention has a superior security characteristic and a high transmission speed of more than 100 Mbps at a low cost. Accordingly, using the high-speed wireless LAN system according to the present invention, it is expected that the installation of an ultrahigh-speed wireless LAN system in national organizations, company research institutes, financial institutions, etc., can be expedited, and the optical system can even be introduced into general homes.

While the invention has been shown and described with reference to certain preferred embodiments thereof, it will be understood by those skilled in the art that various changes in form and details may be made therein without departing from the spirit and scope of the invention as defined by the appended claims. For example, while the optical system has been referred to herein as an infra-red (IR) system, one skilled in the art would recognized at the optical system may also include frequencies in the visible or ultra-violet or higher ranges with suitable alterations in the components selected. Additionally, while the transmitter and receiver functions have been referred to separately, one skilled in the art would recognize that these functions may be performed by individual units or combined in a single unit. Hence, the commonly referred to term "transceiver" shall be used to define both configurations.

What is claimed is:

1. A high-speed wireless LAN system comprising:
   a mobile station, at least one associated access point and a gateway, said at least one access point and gateway connected by at least one optical fiber;
   the mobile station for:
      transmitting and receiving a data signal encrypted by a predetermined encryption method;
      communicating the encrypted data signal by an ultra wide-band (UWB) communication method; and
      communicating an encryption key signal according to the encryption method by an optical communication method;
   the at least one associated access point, installed in a plurality of predetermined service areas, for:
      receiving said encrypted data signal and encryption key;
      relaying via an optical fiber communication method the encrypted data signal and the encryption key signal, said access point comprising:
      a WDM for multiplexing/de-multiplexing the data signal and the encryption key signal transmitted/received through the gateway sub-module and the optical fiber;
      a semiconductor optical amplifier (SOA) for converting an optical signal corresponding to the data, which is received from the gateway sub-module through the WDM, into a current signal to transmit by wireless the current signal through the UWB antenna, and outputting an optical signal with its gain amplified according to the data signal received through the UWB antenna to transmit the optical signal to the gateway through the WDM;

a controller for providing a current to said SOA, wherein in one communication direction the controller provides a current to less than a threshold current while in an opposite communication direction applying a current more than a threshold current; and an IR optical antenna for transmitting the encryption key signal received through the WDM to the mobile station as an IR signal, receiving the encryption key signal transmitted from the mobile station, and transmitting the received encryption key signal to the gateway through the WDM; and the gateway, located at a remote place by providing an optical interface between an internal network and an external network, comprising:

a plurality of gateway sub-modules for transmitting/receiving the encrypted data signal and the encryption key signal via said optical communication method, and transmitting a subscriber service transmitted from the external network to the corresponding access point, said gateway sub-modules comprising:

a 2-channel array optical transmitter/receiver module for transmitting/receiving the encryption key signal through the IR method and the data signal through the UWB method by channels having different center wavelengths; and a wavelength division multiplexer (WDM) for multiplexing/de-multiplexing the encryption key signal and the data signal.

2. The high-speed wireless LAN system as claimed in claim 1, wherein the mobile station comprises:

an optical module for transmitting/receiving the encryption key signal to/from the access point as an optical signal; and a UWB module for:
transmitting/receiving wirelessly the data signal to/from the access point through an UWB antenna;
transferring the encrypted data signal transmitted/received through the UWB antenna to a media access control (MAC) layer in a UWB physical (PHY) layer;
interfacing the data signal and the encryption key signal with an upper layer in the MAC layer by exchanging the high-speed data signal through the UWB PHY layer; and
exchanging the encryption key signal with the IR module.

3. The high-speed wireless LAN system as claimed in claim 1, wherein the gateway sub-module comprises:
a UWB module for transmitting/receiving the data signal to/from the UWB optical transmitter/receiver in a UWB physical (PHY) layer, and interfacing the data signal and the encryption key signal with an upper layer in a media access control (MAC) layer by exchanging the data signal through the UWB PHY layer and exchanging the encryption key signal with the optical transceiver.

4. The high-speed wireless LAN system as claimed in claim 1, wherein said optical signal for transmitting the encryption key is selected from the group consisting of: a infra-red frequency range signal, a visible light frequency range signal, and a ultra-violet light frequency range signal.

5. The high-speed wireless LAN system as claimed in claim 1, wherein said optical communication means is a single mode or multi-mode fiber.

* * * * *